United States Patent
Yarus (10) Patent No.: US 10,379,257 B2
(45) Date of Patent: Aug. 13, 2019

(54) DISTRIBUTING PETROFACIES USING ANALYTICAL MODELING

(71) Applicant: Landmark Graphics Corporation, Houston, TX (US)

(72) Inventor: Jeffrey M. Yarus, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 951 days.

(21) Appl. No.: 14/239,941

(22) PCT Filed: Oct. 22, 2013

(86) PCT No.: PCT/US2013/066058
§ 371 (c)(1),
(2) Date: Feb. 20, 2014

(87) PCT Pub. No.: WO2014/066312
PCT Pub. Date: May 1, 2014

(65) Prior Publication Data
US 2015/0316682 A1    Nov. 5, 2015

Related U.S. Application Data

(60) Provisional application No. 61/718,893, filed on Oct. 26, 2012.

(51) Int. Cl.
*G01V 11/00* (2006.01)
*G01V 99/00* (2009.01)
*G06F 17/10* (2006.01)

(52) U.S. Cl.
CPC ............ *G01V 99/005* (2013.01); *G01V 11/00* (2013.01); *G06F 17/10* (2013.01)

(58) Field of Classification Search
CPC ........ G01V 99/005; G01V 11/00; G06F 17/10
(Continued)

(56) References Cited

U.S. PATENT DOCUMENTS 4,903,527 A * 2/1990 Herron ................... G01V 11/00
702/12
5,416,750 A    5/1995 Doyen et al.
(Continued)

FOREIGN PATENT DOCUMENTS

WO    2012096663 A1    7/2012
WO    WO-2012102716 A1    8/2012

OTHER PUBLICATIONS

Maučec et al., Next generation geological modeling for hydrocarbon reservoir characterization, Dec. 2011, INTECH Open Access Publisher, pp. 216-240.*
(Continued)

*Primary Examiner* — Juan C Ochoa (57) ABSTRACT

Distributing petrofacies using analytical modeling. At least some of the illustrative embodiments are methods including: creating, by a computer system, a geocellular model of an underground formation, the creating by: reading a first value of a first rock property associated with a first well log; associating the first value of the first rock property with a first cell of a plurality of cell of the geocellular model; assigning a value of the first rock property to each cell of the plurality of cells based on the first value and a datum of information, the datum of information distinct from the first value.

23 Claims, 8 Drawing Sheets

(58) Field of Classification Search
USPC .................................................. 703/2, 10
See application file for complete search history.

(56) References Cited

U.S. PATENT DOCUMENTS

| | | | | |
|---|---|---|---|---|
| 5,675,147 | A * | 10/1997 | Ekstrom | G01V 11/00 250/256 |
| 5,838,634 | A * | 11/1998 | Jones | G01V 1/282 367/73 |
| 6,480,790 | B1 * | 11/2002 | Calvert | G01V 1/282 702/14 |
| 6,654,692 | B1 | 11/2003 | Neff | |
| 7,373,251 | B2 * | 5/2008 | Hamman | G01V 1/306 367/73 |
| 7,720,607 | B2 * | 5/2010 | Lecerf | G01V 1/366 175/50 |
| 7,835,893 | B2 | 11/2010 | Cullick et al. | |
| 8,095,345 | B2 * | 1/2012 | Hoversten | G01V 11/00 702/181 |
| 8,583,411 | B2 * | 11/2013 | Fung | E21B 49/00 703/10 |
| 8,688,425 | B2 * | 4/2014 | Oppert | G01V 99/00 703/10 |
| 9,026,420 | B2 * | 5/2015 | Gorell | G01V 99/00 703/10 |
| 9,279,905 | B2 * | 3/2016 | Ronot | G01V 1/282 |
| 9,747,393 | B2 * | 8/2017 | Dasari | G01V 99/005 |
| 2002/0042702 | A1 | 4/2002 | Calvert et al. | |
| 2006/0136162 | A1 | 6/2006 | Hamman et al. | |
| 2008/0157584 | A1 * | 7/2008 | Kieschnick | E21B 49/00 299/2 |
| 2008/0162050 | A1 | 7/2008 | Harris et al. | |
| 2008/0262810 | A1 * | 10/2008 | Moran | E21B 7/00 703/10 |
| 2009/0210160 | A1 * | 8/2009 | Suarez-Rivera | G01V 11/00 702/6 |
| 2010/0326669 | A1 | 12/2010 | Zhu et al. | |
| 2012/0239361 | A1 * | 9/2012 | Vargas-Guzman | G06T 17/05 703/6 |

OTHER PUBLICATIONS

European Patent Office, Supplementary European Search Report, dated Jun. 7, 2016, 6 pages, Europe.
Search Report and Written Opinion, PCT Application No. PCT/US2013/066058, dated Jan. 23, 2014.
Australian Government IP Australia, Patent Examination Report No. 1, dated Apr. 1, 2016, 4 pages, Australia.

* cited by examiner

DISTRIBUTING PETROFACIES USING ANALYTICAL MODELING

BACKGROUND

Earth modeling uses knowledge of a variety of geological, geophysical, petrological, and mechanical properties derived from wellbore measurements, seismic surveys, and remotely sensed sources. Properties that are often modeled are the geological and petrofacies. These two properties are not guaranteed to be equivalent and require different approaches to interpolation and/or simulation to ensure realistic spatial continuity.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the terms "couple" or "couples" are intended to mean either an indirect or direct connection. Thus, if a first device couples to a second device, that connection may be through a direct connection or through an indirect connection via other devices and connections.

"Rock type" shall mean a rock having certain rock properties. Rock type may alternatively be referred to as "petrofacies."

"Rock properties" shall mean a physical feature or measured value of a rock type. Porosity and permeability are examples of rock properties. Likewise, sonic velocity (speed of sound through the rock) and gamma readings are example of rock properties.

"Depositional facies" shall mean a depositional structure, such as a point bar, channel, splay, and marine bar. Depositional facies shall not imply any particular rock type or rock property, although a certain depositional facies may often be associated with certain rock types and rock properties. Depositional facies may alternatively be referred to as "geological facies."

"Geocellular model" shall mean a model of an underground formation, the model comprising a plurality of cells or tessellations that represent a predetermined volume.

"Distance" in reference to cells of a geocellular model shall mean a conceptual distance represented by the geocellular model, and shall not be read to require an actual physical distance between cells.

"Variogram" shall mean a function that defines a spatial dependence of a rock property. For example, a variogram may indicate a high probability of presence of the rock property in directions along a north-south line, and a low probability of presence of the rock property in directions along an east-west line.

"Regionalized variable" shall mean a variable describing a property which has geographic meaning and thus can be estimated or simulated in a geographic space.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to communicate that the scope of the disclosure, including the claims, is limited to that embodiment.

The various embodiments are directed to methods and systems of creating a geocellular model of an underground formation. More particularly, the various embodiments may involve creating the geocellular model by obtaining rock properties from one or more well logs, and assigning the obtained rock properties to a three-dimensional model in order to more accurately estimate rock types. The specification first turns to a discussion of the related art.

RELATED ART

Knowing the properties and locations of underground rock formations is useful for making decisions as to where and how to perform hydrocarbon drilling operations. In particular, a geologist making drilling decisions may consider various rock types in an underground formation, where each rock type may be comprised of rock properties describing composition and structure. For example, a section of an underground formation may be comprised of the following different rock types: sandstone; limestone; shale; and granite, where each rock type has rock properties that differ from one another. In addition, where each rock type may have differing rock properties from other rock types, among a singular rock type, different locations within a rock type may have varying rock properties.

In order to ascertain information regarding the underground formation, rock properties for each rock type may be measured and subsequently recorded in a well log. Well logging is a technique used to identify properties associated with earth formations surrounding a wellbore. The interrogation of a formation surrounding a wellbore to identify one or more property of a rock type may be by, for example, sound, electrical current, electromagnetic waves, or high energy nuclear particles (e.g., gamma particles and neutrons).

More specifically, at various times in the creation of a well, various tools may be run within the well to create well logs to measure rock properties, where the rock properties may be indicative of the ability of the formation to economically produce hydrocarbons. For example, well logs may include natural gamma logs (i.e., created by a tool that measures natural gamma radioactivity), gamma-gamma logs (i.e., created by a tool that releases interrogating energy in the form of gamma rays or particles); formation porosity; formation resistivity; formation permeability; acoustic impedance; and spectral information of the underground formation at a particular depth.

Rock properties are only measured within a limited radius around the well in which measurements are taken. The rock properties are aggregated into a well log, where a geologist makes a determination as to the rock type surrounding the well based on the rock properties in the well log. However, because the geologist is able to make a determination as to the rock type only within a certain distance from the well (based on information obtained from the well logs), in order to create a model of the underground formation in the related art, rock types can be distributed between measured wells as if the rock types were regionalized variables. For example, if the rock type measured in one well is shale, and the rock type measured in a nearby offset well is also shale, then the rock type between the two wells may be assumed to be shale as well, regardless if shale is or is not present between the two wells and regardless of any additionally measured rock properties.

Furthermore, because knowledge of rock type does not necessarily imply a depositional facies, distributing rocks types using this method does not guarantee that the resulting geometries of the created models will make sense in the way they would if the depositional facies were known. Further, in distributing rock types, valuable information in the form of varying rock properties for a singular rock type will be lost.

Creating a Geocellular Model

Figure 1:
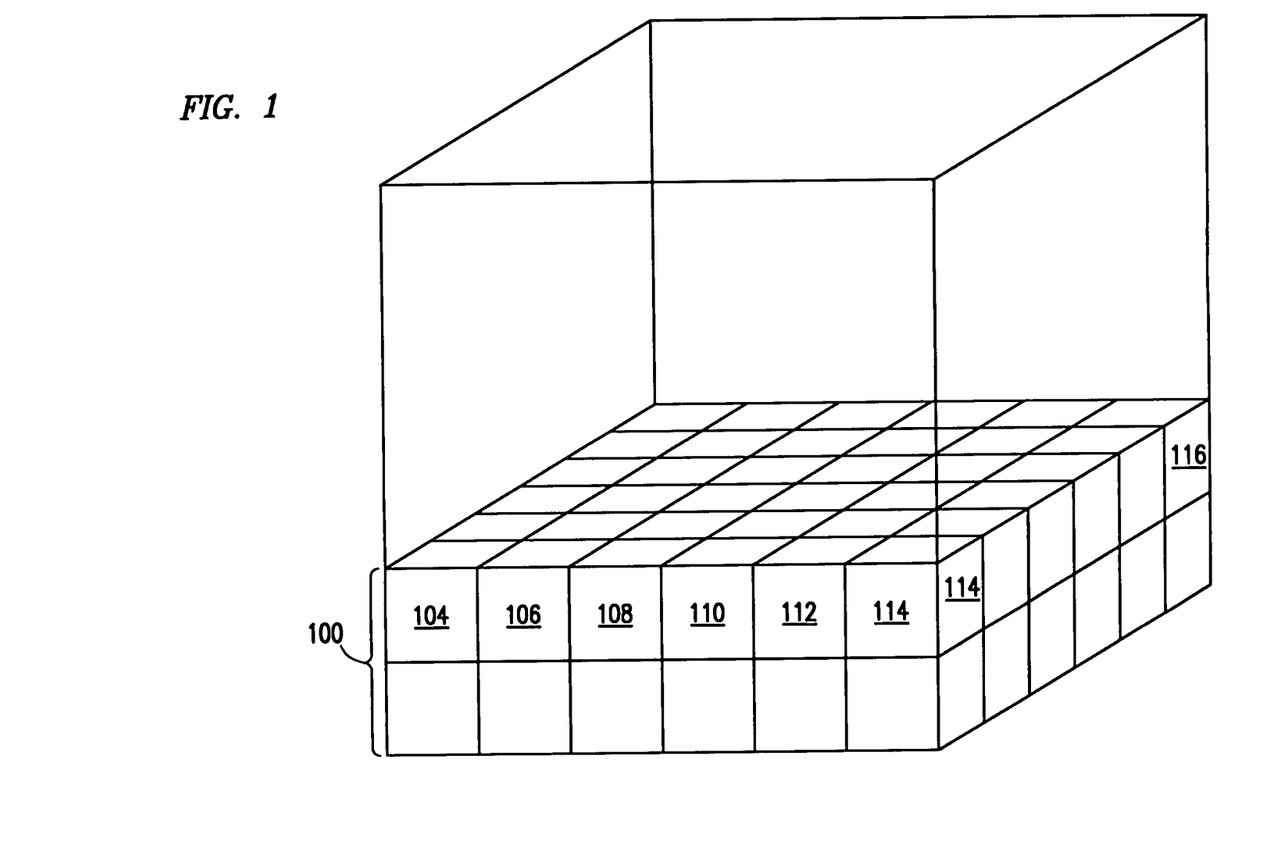
FIG. 1 shows a perspective view of a portion of a geocellular model in accordance with at least some embodiments.

In accordance with at least some embodiments, some or all of an underground hydrocarbon bearing formation (herein after "underground formation" or "formation"), including petrofacies, may be modeled by the creation of a three-dimensional geocellular model. FIG. 1 shows a perspective view of a portion of a geocellular model 100. As the name implies, a geocellular model comprises a plurality of cells, for example cells 104, 106, 108, 110, 112, 114 and 116, where all of the cells considered together approximate the physical extent of the formation (or a relevant section of the formation). As shown in FIG. 1, in some embodiments, the example cells 104-116 are cubical and have approximately equal volume. For example, cell 104 may represent 75 cubic feet of earth. However, in other embodiments, the cells may have varying volumes and varying shapes.

It is to be understood that each cell (e.g., cells 104-116) is a mathematical construct, not a physical construct. The illustration of FIG. 1 showing the geocellular model 100 is merely to orient the reader to the idea of a geocellular model which may later represent a portion of an underground formation.

In order to, ultimately, more accurately describe the rock types within an underground formation, the geocellular model 100 will be provided with and will contain data describing the rock properties represented by the location of each individual cell using analytical modeling (e.g., interpolation, simulation, and other geostatistical principles).

Figure 2:
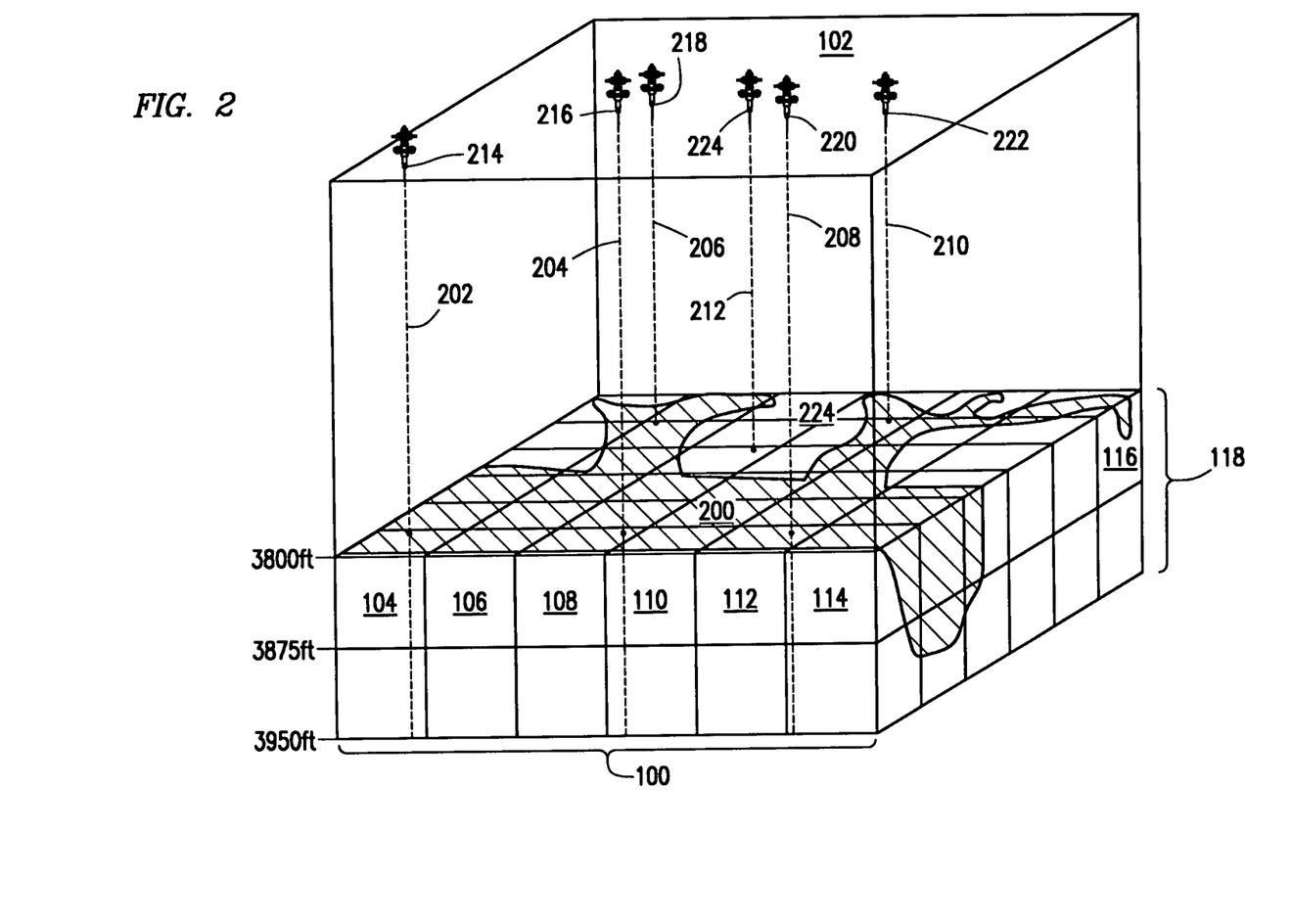
FIG. 2 shows a perspective view of a portion of a geocellular model in accordance with at least some embodiments.

For example, each cell may contain a value indicative of the porosity of the portion of the formation associated with the respective cell in the geocellular model 100. In another embodiment, each cell may contain more than one value; for example, each cell may contain a value indicative of the porosity, as well as a value indicative of permeability and/or gamma radiation and/or resistivity. Because actual values are possible only where values have been measured (e.g., with downhole measuring tools), cells without associated measured values will be algorithmically assigned with interpolated and/or simulated rock property values. FIG. 2 provides a more detailed snapshot of the geocellular model 100.

FIG. 2 shows a perspective view of a portion of the geocellular model 100 located below the earth's crust 102. The geocellular model 100 is graphically displayed over a portion of a formation. The layers between the surface 102 and the geocellular model 100 are not shown so as to avoid unduly complicating the figure, and also to provide a clear view of the cross-section of the depositional facies contained within the geocellular model 100.

The location of a cell of the geocellular model 100 correlates conceptually to the corresponding location of the formation 118. In particular, the geocellular model 100 of FIG. 2 is overlaid over a portion of formation 118 which illustratively contains two rock deposits, rock deposit 200 (shown in hatched lines) and rock deposit 224, which lie between 3800 feet below the surface and 3950 feet below the surface. The depositional facies of rock deposit 200 is defined geometrically by a channel and two splays. For purposes of discussion, rock deposit 200 is considered to be sandstone, and rock deposit 224 is considered to be shale.

FIG. 2 also shows several wellbores drilled into the hydrocarbon bearing formation 118. Wellbores 202, 204, 206, 208, 210, and 212 are associated with wellheads 214, 216, 218, 220, 222, and 224, respectively, to illustrate that the wellbores have been previously drilled. The illustrative wellbores are displayed as vertical but they can have any geometry, including wellbores where a portion of the wellbore is horizontal. In addition, it should be noted that, although wellbores 202-212 are shown as previously drilled, data regarding the underground formation 118 may have been gathered at any stage of the creation of each wellbore.

Although the rock deposits 200 and 224 are shown as having specific depositional facies, the depositional facies of either rock deposit is not precisely known from or depicted in the geocellular model. Using methods described later in the discussion, cells of the geocellular model 100 will be populated with rock properties in order to provide a more accurate model of the underground formation 118.

Figure 3:
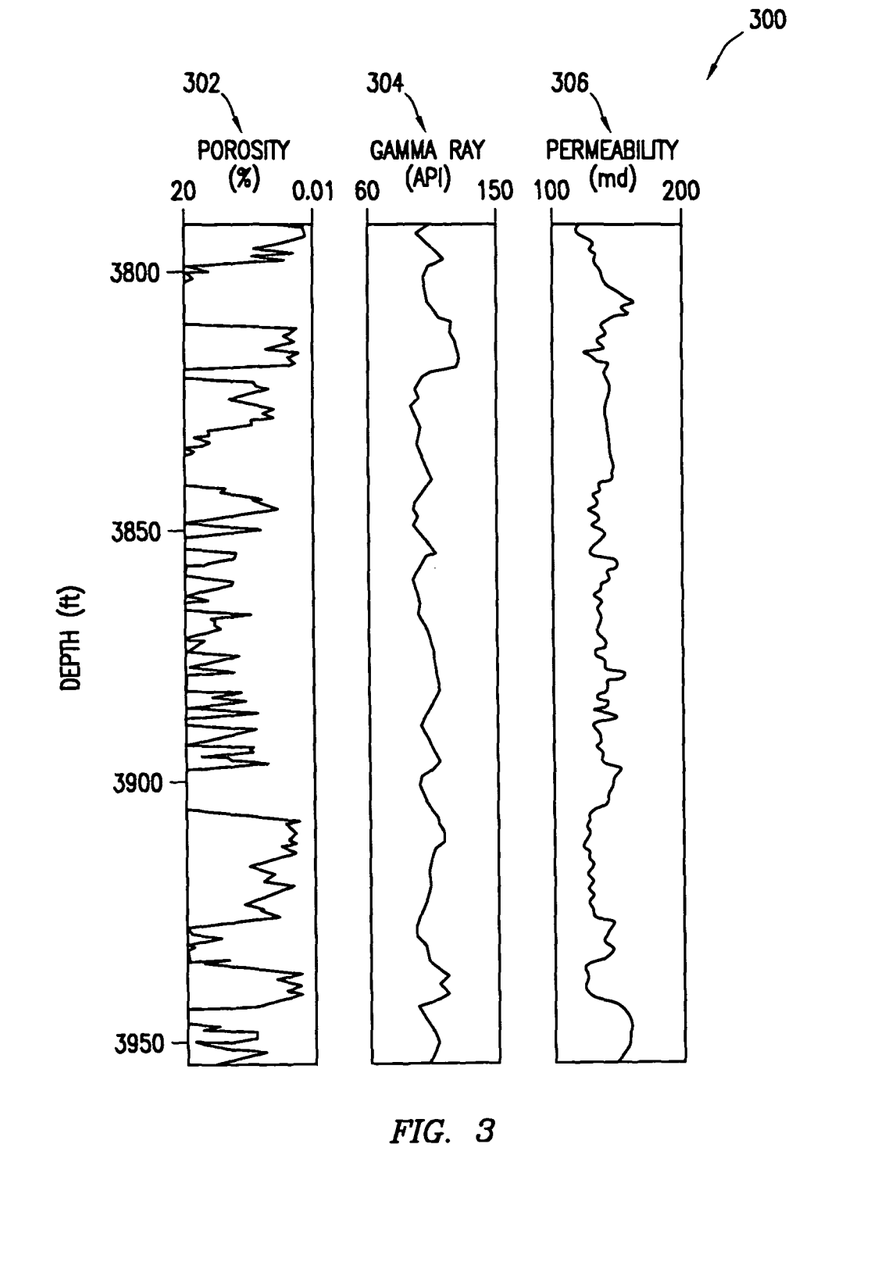
FIG. 3 shows a portion of a well log in accordance with at least some embodiments.

By using measuring tools within with each wellbore, data regarding the rock properties within a certain radial distance of the measuring tools is determined and used to create a well log, such as the example well log shown in FIG. 3.

Turning briefly to FIG. 3, a portion of a well log 300 for an example well is shown in accordance with at least some embodiments. In particular, well log 300 displays plotted data measured and obtained between the example vertical depths of 3800 feet to 3950 feet. In the example well log 300, three types of measurements have been plotted with regard to the rock properties surrounding the well: porosity 302; gamma radiation 304; and permeability 306. In the particular example, from a depth of 3850 to 3865, the measured porosity is ranges from 18% to 20%, the measured gamma radiation ranges from 55 API (where "API" is an "American Petroleum Institute" unit) to 150 API; and the permeability is 100 millidarcy (md) to 200 md. At a depth from 3900 to 3935 feet, the measured porosity ranges from 20% to 0.01%; the measured gamma radiation ranges from 60 API to 150 API; and the permeability ranges from 100 md to 200 md. Based on the measured rock properties, a rock type may be determined over a length of well bore and represent the area around the well.

Although each rock type (e.g., sandstone, shale, etc.) is characterized by a general set of innate rock properties, as can be seen in the example well log, it can also be seen that a single rock type may have varying rock properties based on location and/or depth. Furthermore, between rock types, such as between limestone and shale, the rock properties may vary further. By way of mechanisms discussed more below, well log information, such as the well log information obtained and plotted in FIG. 3, will be used to create the geocellular model 100 shown in FIG. 2.

Figure 4:
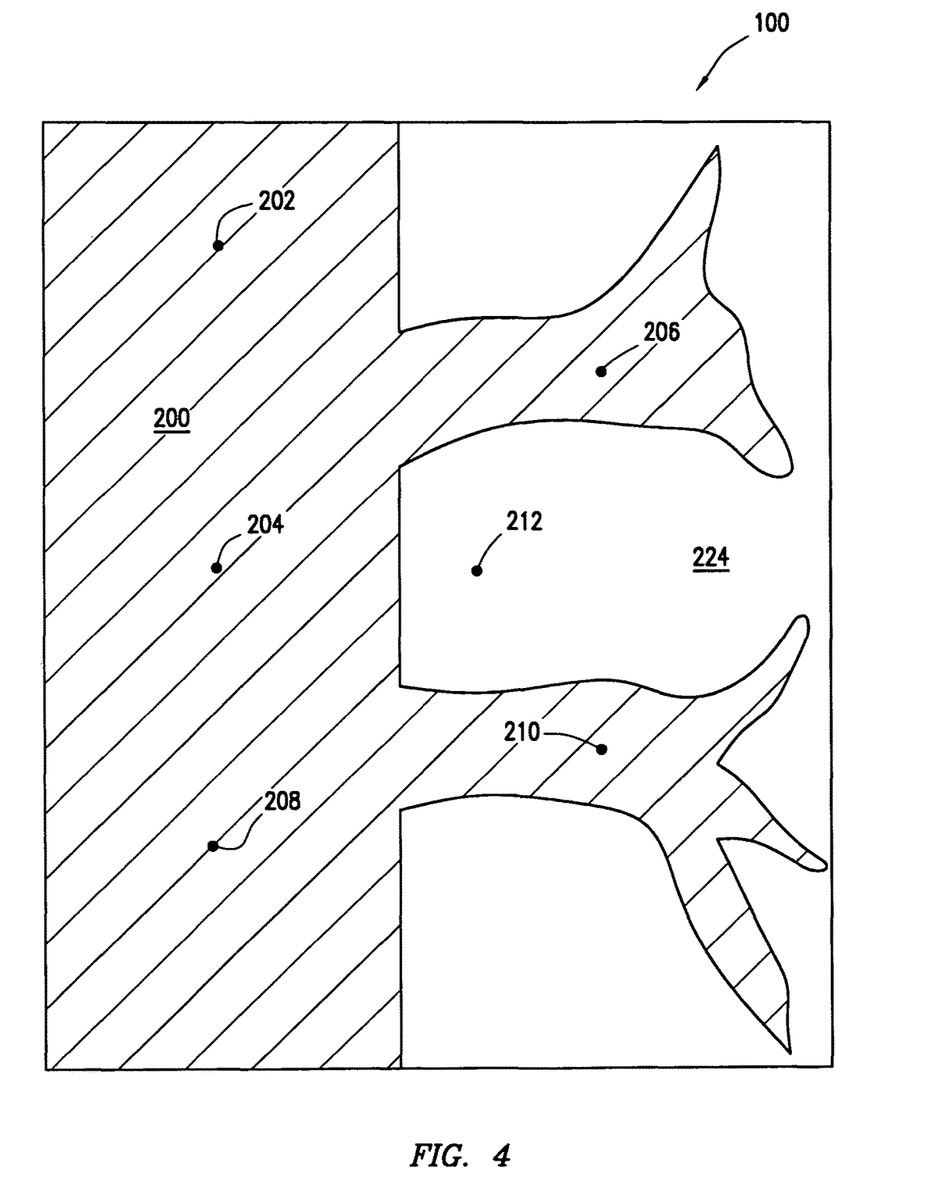
FIG. 4 shows an overhead view of a cross section of rock deposits in accordance with at least some embodiments.

Turning now to FIG. 4, FIG. 4 shows an overhead view of a cross section of rock deposit 200 and rock deposit 224 at a depth of 3800 feet (i.e., the top of the geocellular model 100). Also visible in the overhead view is the location of the wells 202-212, shown as dots.

Data obtained from tools associated with wells 202, 204, 206, 208 and 210 may indicate that the rock type surrounding those wells is sandstone. However, outside of a certain radial distance from the center of each well (e.g., 10 feet), it is difficult to know if the rock type is actually sandstone. Likewise, data obtained from tools associated with well 212 indicates that the rock type surrounding well 212 (within a certain radial distance) is shale in the example of FIG. 4.

If no other information is provided to the geologist besides that of the corresponding well logs, it is difficult to determine an accurate representation of the depositional facies of rock deposits 200 and 224, nor the rock properties outside a certain radius from the measuring tools. Thus, looking at FIG. 4, if well 212 was not present, the geologist may believe the rock type between wells 206 and 210 to also be sandstone. Likewise, the engineer may believe the rock type between wells 202 and 206 to be solely sandstone.

Associating Data into the Geocellular Model

In order to produce a more accurate model, and in accordance with example embodiments, the geologist creates the geocellular model by obtaining a rock property from the well log and associating that value with a corresponding cell in the geocellular model 100. For each rock property obtained from the well log, the rock property will be associated with the property's associated location in the geocellular model 100 (i.e., in the cell which corresponds to the location in the formation from which the rock property value was measured).

For example, returning to FIG. 2, the rock properties associated with well 202 and obtained from the well log can be associated with cells 104 and the cell directly below cell 104. Likewise, the rock properties associated with well 204 can be associated with cell 108 and the cell directly below cell 108. Although the geocellular model 100 is shown as having two layers comprising a total of 72 cells, in reality, the geocellular model may be on the order of tens to thousands of layers with thousands or even tens of thousands of cells.

In addition, rock property values distributed into a cell are applicable to the entire cell volume. In other words, in cells representing locations in the formation 118 where more than one rock type is present, such as cell 114, the distribution of rock property values will not provide the geologist with enough information to determine two distinct rock types. Although the distribution of rock property values into the cells of the geocellular model may help to provide a more accurate depiction of the depositional facies, the distribution will not provide an indication of the exact depositional facies.

In an example embodiment, from the well log associated with well 202, a porosity value is obtained. The porosity value is then stored in the respective locational cell in the geocellular model: cell 104, and in FIG. 2, the cell directly below cell 104. Because no well log data is available for the location corresponding to cell 106 in this example, cell 106 does not yet receive a value to store. Continuing to the right (towards cell 114), a porosity value is obtained from well log data corresponding to well 204 between the depths for 3800 feet and 3875 feet. The obtained porosity value is then stored in the corresponding locational cell in the geocellular model: cell 108, and in FIG. 2, the cell directly below cell 108. Each cell in the geocellular model is correspondingly associated with measured data values where possible. For example, each cell may have one or more of the following example measurements associated: porosity, gamma, permeability, resistivity, and additional seismic data.

Interpolation Between Cells

For cells in which there is no actual rock property measurement available (e.g., porosity, gamma radiation, permeability has not been measured or it not present in a well log), values may be assigned by interpolating between the cells. Returning again to FIG. 2, well 202 is drilled through the hydrocarbon formation 118 at a location that corresponds to cell 104 in the geocellular model 100. Through the use of downhole measuring tools, a well log of data is aggregated (e.g., the well log of FIG. 3), and certain rock properties are known for the portion of sandstone present in the hydrocarbon formation 118 corresponding to the location of cell 104 within the geocellular model. Similarly, well 204 is drilled through the hydrocarbon formation 118 at a location that corresponds to cell 108 in the geocellular model 100, and a well log of data is aggregated with respect to rock properties measured within the portion of sandstone present in the hydrocarbon formation 118 corresponding to the location of cell 108 within the geocellular model. Within the volume of cell 106, however, no corresponding well has been drilled into the hydrocarbon formation 118, and thus, there are no downhole measurements taken and no corresponding well log.

For cells in which there is no corresponding measurement data, any suitable interpolation technique may be used to distribute rock properties. In one embodiment, a previously unknown rock property value in a cell is interpolated by considering the known rock properties of two nearby cells. For example, a known rock property value for well 202 and corresponding to cell 104 is considered, as is a known rock property for well 204 corresponding to cell 108. In addition, the respective distances between cell 104 and cell 108 to cell 106 (i.e., the cell with no known rock property value), is considered. In this example, cells 104 and 108 are equidistant from cell 106, and thus the rock properties of cell 104 and 108 may be interpolated equally into 106. More specifically, if the porosity for cell 104 is 20% and the porosity for cell 108 is 22%, the interpolated porosity for cell 106 may be 21%.

In another embodiment, a series of variograms may be calculated with respect to the measured data. A variogram is a statistical function that is indicative of the difference between data points as a function of distance and direction (azimuth). Once the variograms have been calculated, the data points representing the non-measured rock properties may be calculated using a kriging or co-kriging technique.

One of ordinary skill in the art is aware of the kriging or co-kriging techniques, and now understanding application of the kriging or co-kriging techniques to the situation of updating a geocellular model would understand how to apply the kriging or co-kriging techniques to the geocellular model 100.

Figure 5:
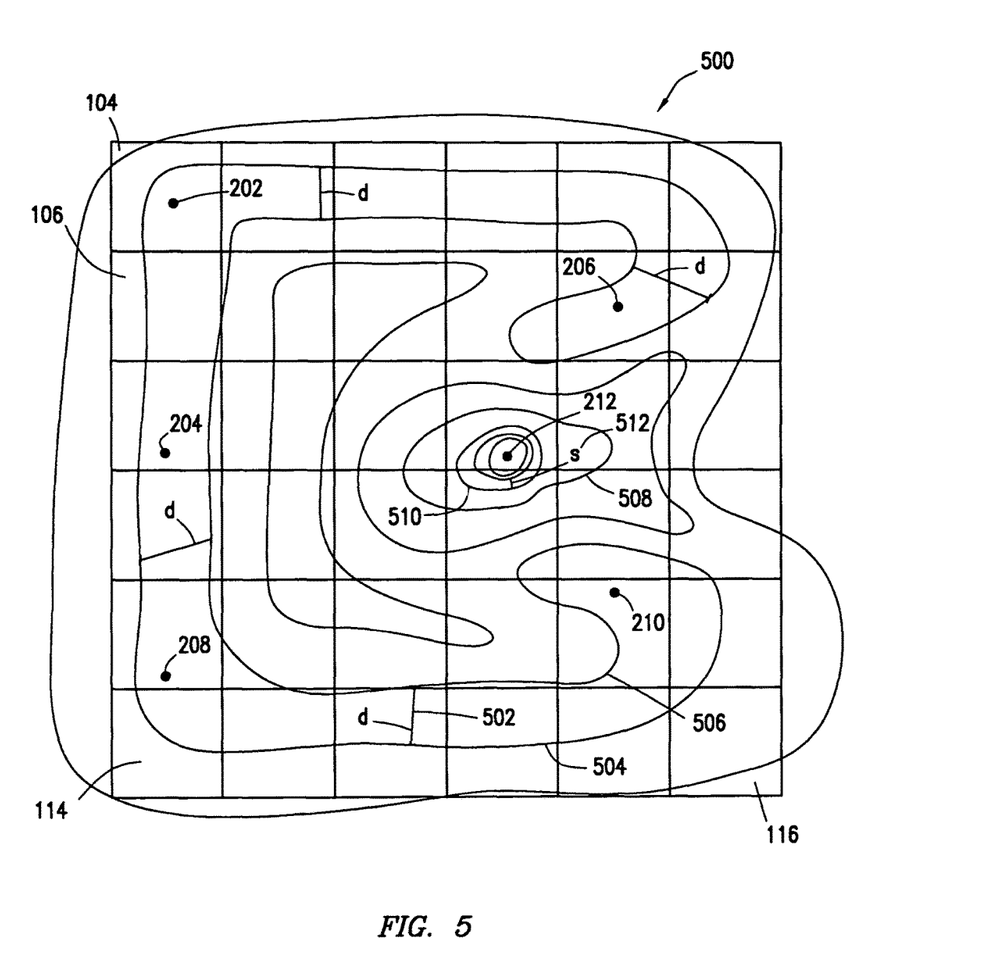
FIG. 5 shows an overhead view of a representation of a distributed rock property in a geocellular model in accordance with at least some embodiments.

FIG. 5 shows an overhead view of a depiction of a distributed rock property among a layer of cells within the geocellular model 100 after interpolation. In particular, FIG. 5 shows a visual representation 500 of one distributed rock property (e.g., porosity). Also visible, and for reference, are the locations of the wells 202-212 where each well corresponds to the location of each respective cell in the geocellular model. The distance between each of the lines may indicate either a measured rock property or an interpolated rock property. For example, if the rock property shown in FIG. 5 is porosity, the farther apart each adjacent line is on the representation 500, the higher the porosity. In contrast, the closer each line is to adjacent line, the lower the porosity.

More specifically, the distance 502 'd' between lines 504 and 506 is constant within the representation, indicating that the porosity between lines 504 and 506 is approximately the same. In contrast, the lines grow closer together near the representation of well 212, such that the distance 512 's' between lines 508 and 510 indicates a lower porosity than between the lines 504 and 506.

Multiple rock properties may be "mapped" into individual visual representations such as the one shown in FIG. 5. In addition, it may be possible to create a representation with more than one rock property depicted. Although representation 500 is shown to be similar to a topographic map, any suitable representation is possible, including a heat map; a shaded variant map; or other depiction of a distributed rock property in the geocellular model.

Seismic Survey Data

In another embodiment, additional data may be obtained by way of a seismic survey. That is, a seismic survey (e.g., land-based survey, marine survey) may have been conducted to provide seismic mapping of the subsurface rock deposits associated with the underground hydrocarbon formation 118, resulting in seismic data. Thus, seismic data and/or well log data may be used to provide more accurate interpolations of rock properties including, in some cases, better estimations of the depositional facies of the rock deposits.

Obtaining a seismic survey may involve placing long strands of cable across the surface 102 of the earth, the cable having periodically spaced seismic receiving devices. The seismic receiving devices are placed in a grid pattern over or proximate to the formation of interest. After the seismic receiving devices are placed, a seismic event is triggered, for example by detonation of dynamite or through the use of vibrator trucks which contact the surface of the earth and impart energy. The energy, whether created by dynamite or by trucks, propagates through the various earth layers to the formation of interest, and portions of the signal reflect back to the surface receivers.

For example, seismic waves may be propagated through the formation 118, where a portion of the formation 118 may be comprised of different rock type layers, each layer having different acoustic impedance. For each boundary the seismic wave encounters, some of the energy in the wave will be reflected at the boundary, while some of the energy will be transmitted through the boundary. Because, at the time of the seismic survey, the geologist does not know the composition of the formation 118, the seismic survey will provide some data regarding the formation 118, but will not provide enough data to give a clear indication of the depositional facies underground.

Figure 6:
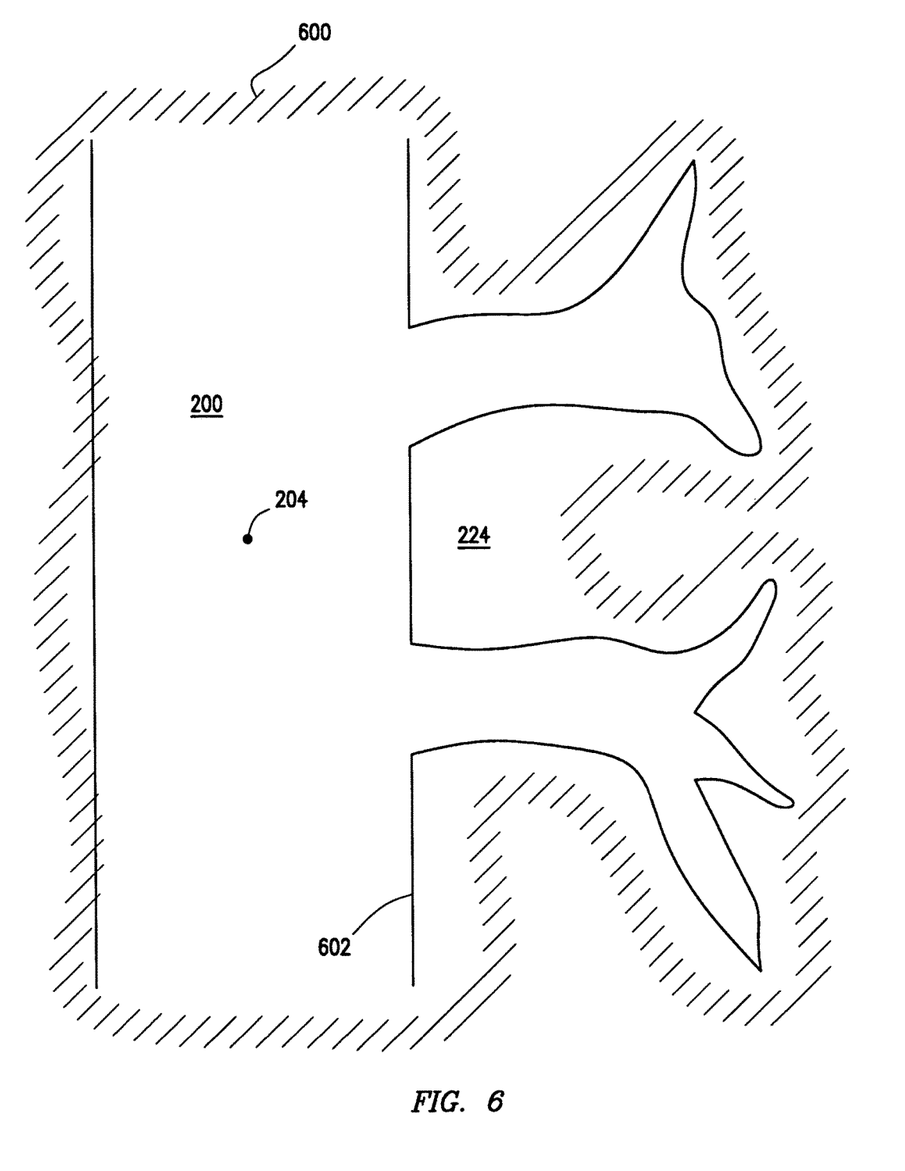
FIG. 6 shows a representation of seismic survey data in accordance with at least some embodiments.

FIG. 6 shows an overhead view of a representation of a seismic map of rock deposits 200 and 224 in accordance with at least some embodiments. Seismic survey data is coarse in the vertical domain; in other words, while it may be possible to know the depositional facies of the rock deposits at a well location where there are measurements, the geometric mapping away from the well may only be accurate within, for example, 40 to 100 feet. In the horizontal domain, however, seismic data has better resolution, and thus can be used to more accurately predict coarse rock types located farther away from the wellbore in the horizontal plane.

FIG. 6 shows an example of the depositional facies of rock deposit 200 obtained by a seismic survey, shown by hashed line 600. In addition, the actual shape of the depositional facies of rock deposit 200 (shown by solid line 602) for comparative reference. The seismic survey may provide the general shape of the rock deposit 200, including a general outline of the channel and the two splays, but seismic data alone cannot refine the geometry to the actual shape (i.e., solid line 602) of rock deposit 200.

Seismic data, therefore, can be used as a co-variable to further refine the geocellular model 100. For example, to the extent seismic data relates to a property to be distributed into the cells of the geocellular model 100 (e.g., acoustic impedance as it relates to porosity), seismic data can provide an additional variable to refine the accuracy of the model.

As with well log data, distribution of rock properties among the cells of the geocellular model may be made by any suitable interpolation technique taking into consideration seismic data. For example, a rock property may be assigned to a cell in the geocellular model by co-kriging a rock property datum and seismic data obtained from a seismic survey. While co-kriging is one possible technique for the distribution of rock properties, other suitable analytical modeling techniques may be used such as kriging, simulation, and/or interpolation.

The discussion has focused on distributing an example rock property within a geocellular model. In the example embodiments, one property (e.g., porosity) was distributed among the cells; however, it is to be understood that multiple rock properties may be, and likely will be, distributed such that each cell of the single geocellular model comprises multiple properties. For example, cell 104 might have multiple values corresponding to the following rock properties: porosity, permeability, gamma radiation, resistivity, and acoustic impedance.

In the case where rock properties have been distributed in the geocellular model, it is now possible to make a determination as the rock type at each location in the geocellular model. In other words, using the rock properties associated with a cell corresponding to the location of the unknown rock type in the formation, by application of associations of rock properties with rock types, a determination can be made as the rock type in each cell of the geocellular model. In some cases, the determination of rock type after distributing of the rock properties can be made by a geologist or geophysicist, but in other cases the rock type determinations can be made programmatically. The end result may be a geocellular model where each cell contains a rock type, but the rock type is determined based on the distributed rock properties. Stated otherwise, a formula or algorithm is applied to each cell of the model in order to ascertain a rock type for the cell based on the plurality of associated and distributed rock properties. The application of the formula may occur on a cell-by-cell basis; for example, for each cell which is populated with respective rock properties, the rock type may be calculated as each cell has been fully filled with the desired information.

In should be noted that although there may be some initial user input (e.g., initial quality control, calibration, specification of which analytical model to run), the creation of the geocellular model, reading a rock property from a well log, associating the value of the rock property with a cell in a geocellular model, assigning the value of the rock properties to the cells in the geocellular model, and then determining rock type from the rock parameters are executed without user input.

Figure 7:
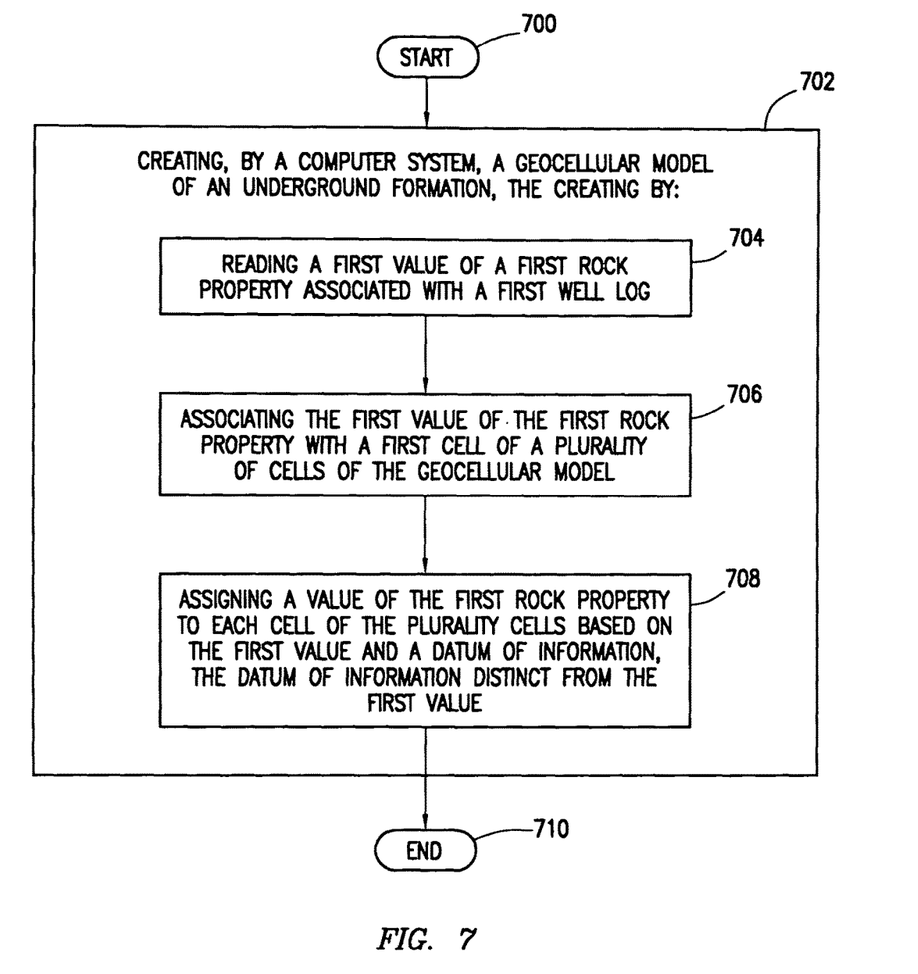
FIG. 7 shows a method in accordance with at least some embodiments.

FIG. 7 shows a method in accordance with example embodiments. In particular, the method starts (block 700) by creating, by a computer system, a geocellular model of an underground formation (block 702), the creating by: reading a first value of a first rock property associated with a first well log (block 704); associating the first value of the first rock property with a first cell of a plurality of cells of the geocellular model (block 706); assigning a value of the first rock property to each cell of the plurality cells based on the first value and a datum of information, the datum of information distinct from the first value (block 708). In addition to data obtained from one well log, data may also be obtained or ascertained from, but not limited to, a second well log, multiple well logs, variograms, and/or seismic survey data. Thereafter, the method ends (block 710).

Figure 8:
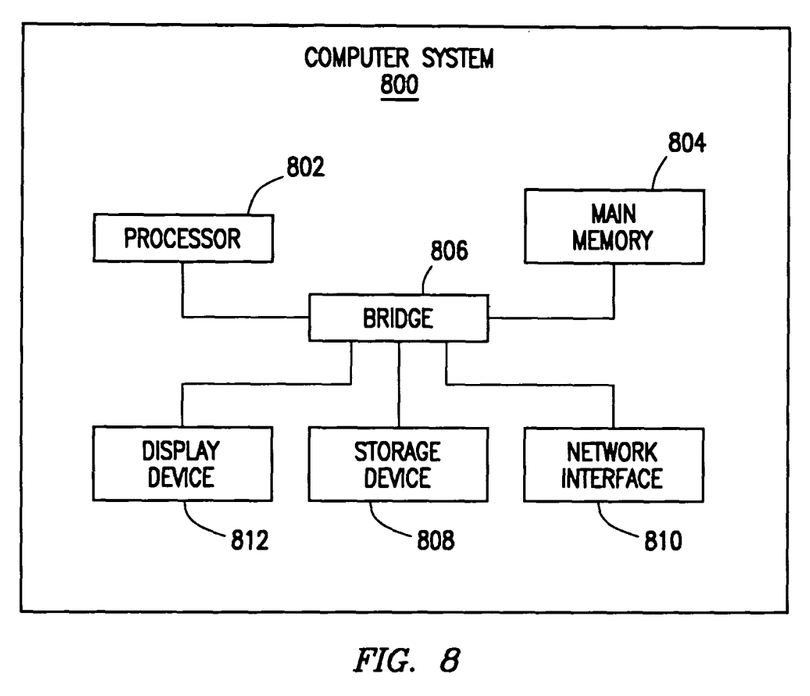
FIG. 8 shows a computer system in accordance with at least some embodiments.

FIG. 8 shows a computer system 800, which is illustrative of a computer system upon which the various embodiments may be practiced. In particular, computer system 800 comprises a processor 802, and the processor couples to a main memory 804 by way of a bridge device 806. Moreover, the processor 802 may couple to a long term storage device 808 (e.g., a hard drive, solid state disk, memory stick, optical disc) by way of the bridge device 606. Programs executable by the processor 802 may be stored on the storage device 808, and accessed when needed by the processor 802. The program stored on the storage device 808 may comprise programs to implement the various embodiments of the present specification. In some cases, the programs are copied from the storage device 808 to the main memory 804, and the programs are executed from the main memory 804. Thus, the main memory 804, and storage device 804 shall be considered computer-readable storage mediums. In addition, a display device 812, which may comprise any suitable electronic display device upon which any image or text can be displayed, may be coupled to the processor 802 by way of bridge 806. Furthermore, computer system 800 may comprise a network interface 810, coupled to the processor 802 by way of bridge 806, and coupled to storage device 804, the network interface acting to couple the computer system to a communication network.

In the specification and claims, certain components may be described in terms of algorithms and/or steps performed by a software application that may be provided on a non-transitory storage medium (i.e., other than a carrier wave or a signal propagating along a conductor). The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

At least some embodiments are methods comprising: creating, by a computer system, a geocellular model of an underground formation, the creating by: reading a first value of a first rock property associated with a first well log; associating the first value of the first rock property with a first cell of a plurality of cells of the geocellular model; assigning a value of the first rock property to each cell of the plurality cells based on the first value and a datum of information, the datum of information distinct from the first value.

Other embodiments may also comprise: assigning based-on the datum of information being a second value of the first rock property associated with a second well log, the second value associated with a second cell of the plurality of cells, and the second cell at a non-zero distance from the first cell.

Other embodiments may also comprise: interpolating based on the first value, the second value, and the distance between the first cell and the second cell.

Other embodiments may also comprise: assigning based on the datum of information derived from a seismic survey of the underground formation.

Other embodiments may also comprise: co-kriging based on the first value and the datum of information derived from the seismic survey.

Other embodiments may also comprise: assigning based on the datum of information derived from a variogram regarding the rock property.

Other embodiments may also comprise: reading a first value of a second rock property associated with a second well log, the second rock property distinct from the first rock property; associating the first value of the second rock property with the first cell of the plurality of cells of the geocellular model; and assigning a value of the second rock property to each cell of the plurality cells based on the first value of the second rock property and the datum of information.

Other embodiments may also comprise wherein the first rock property is at least one selected from the group consisting of: gamma reading of the underground formation at a particular depth; porosity of the underground formation at a particular depth; resistivity of the underground formation at a particular depth; spectral information of the underground formation at a particular depth.

Other embodiments may also comprise wherein reading the first value further comprises reading without user input; wherein associating the first value of the first rock property further comprises associating without user input; and wherein assigning the value of the first rock property further comprises assigning without user input.

Other embodiments may be computer systems comprising: A computer system comprising: a processor; a memory coupled to the processor; the memory storing a program that, when executed by the processor, causes the processor to create a geocellular model by causing the processor to: read a first value of a first rock property associated with a first well log; associate the first value of the first rock property with a first cell of a geocellular model, the geocellular model comprising a plurality of cells, and the first cell one of the plurality of cells; read a second value of a first rock property associated with a second well log distinct from the first well log; associate the second value of the first rock property with a second cell of a geocellular model, the second cell one of the plurality of cells and the second cell distinct from the first cell; assign a value of the first rock property to each cell of the plurality cells, the assignment to each cell based on the first value and the second value; and determining a rock type for each of the plurality of cells, the determining based on the rock properties associated with each cell.

The program may also cause the processor to: interpolate based on the first value, the second value, and a distance between the first cell and the second cell.

The program may also cause the processor to: obtain acoustic impedance information derived from a seismic survey; and wherein when the processor assigns, the program causes the processor to assign based on the first value, the second value, and the acoustic impedance information.

The program may also cause the processor to: perform co-kriging based on the first value, the second value and the acoustic impedance information.

The program may also cause the processor to: assign based on the datum of information derived from a variogram regarding the rock property.

The program may also cause the processor to: read a first value of a second rock property associated with a second well log, the second rock property distinct from the first rock property; associate the first value of the second rock property with the first cell of the plurality of cells of the geocellular model; assign a value of the second rock property to each cell of the plurality cells based on the first value of the second rock property and the datum of information.

The program may also cause the processor to select at least one from the group consisting of: gamma reading of the underground formation at a particular depth; porosity of the underground formation at a particular depth; resistivity of the underground formation at a particular depth; spectral information of the underground formation at a particular depth.

Other embodiments are computer-readable mediums storing instructions that, when executed by a processor, cause the processor to: read a first value of a first rock property associated with a first well log; associate the first value of the first rock property with a first cell of a geocellular model of an underground formation, the geocellular model comprising a plurality of cells, and the first cell one of the plurality of cells; read a second value of a first rock property associated with a second well log distinct from the first well log; associate the second value of the first rock property with a second cell of a geocellular model, the second cell one of the plurality of cells and the second cell distinct from the first cell; and assign a value of the first rock property to each cell of the plurality cells, the assignment to each cell based on the first value and the second value.

The program may also cause the processor to: interpolate based on the first value, the second value, and a distance between the first cell and the second cell.

The program may also cause the processor to: obtain acoustic impedance information derived from a seismic survey; and wherein when the processor assigns, the program causes the processor to assign based on the first value, the second value, and the acoustic impedance information.

The program may also cause the processor to: perform co-kriging based on the first value, the second value and the acoustic impedance information.

The program may also cause the processor to: assign based on the datum of information derived from a variogram regarding the rock property.

The program may also cause the processor to: read a first value of a second rock property associated with a second well log, the second rock property distinct from the first rock property; associate the first value of the second rock property with the first cell of the plurality of cells of the geocellular model; assign a value of the second rock property to each cell of the plurality cells based on the first value of the second rock property and the datum of information.

The program may also cause the processor to select at least one from the group consisting of: gamma reading of the underground formation at a particular depth; porosity of the underground formation at a particular depth; resistivity of the underground formation at a particular depth; spectral information of the underground formation at a particular depth.

It is noted that while theoretically possible to perform some or all the calculations and analysis by a human using only pencil and paper, the time measurements for human-based performance of such tasks may range from man-days to man-years, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

References to "one embodiment", "an embodiment", and "a particular embodiment" indicate that a particular element or characteristic is included in at least one embodiment of the invention. Although the phrases "in one embodiment", "an embodiment", and "a particular embodiment" may appear in various places, these do not necessarily refer to the same embodiment.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a computer-readable media that stores a software program to implement the method aspects of the various embodiments.

The above discussion is meant to be illustrative of the principles and various embodiments of the present invention. Numerous variations and modifications will become apparent to those skilled in the art once the above disclosure, is fully appreciated. It is intended that the following claims be interpreted to embrace any and all such variations and modifications.

I claim:
1. A method comprising:
creating, by a computer system, a geocellular model of an underground formation, the geocellular model including a plurality of cells, each cell representing a portion of the underground formation at a location corresponding to that cell's location in the geocellular model;
receiving, by the computer system from a downhole tool communicatively coupled to the computer system, measurements of rock properties of the underground formation;
reading, by the computer system from a first well log stored in a memory of the computer system, a first measured value of a first rock property for a portion of the underground formation corresponding to a first cell of the plurality of cells, the first well log including the rock properties measured by the downhole tool in a first offset well;
associating the first measured value of the first rock property with the first cell of the plurality of cells of the geocellular model;

assigning a value of the first rock property to each cell of the plurality of cells for which no measurement of the first rock property is available, based on an interpolation of the first rock property from the first measured value of the first rock property associated with the first cell and a datum of information representing a value of the first rock property for a portion of the underground formation corresponding to a second cell of the plurality of cells, wherein the first and second cells are equidistant from the cell for which no measurement of the first rock property is available;

obtaining, by seismic receiving devices coupled to the computer system, seismic data derived from a seismic survey of the underground formation;

refining, by the computer system on a cell-by-cell basis, rock property values assigned to each cell of the geocellular model, based at least partly on the seismic data obtained for the portion of the underground formation corresponding to that cell; and determining a rock type for the portion of the underground formation corresponding to each cell of the refined geocellular model, based on a distribution of rock property values among the plurality of cells.

2. The method of claim 1 wherein the datum of information is a second measured value of the first rock property read from a second well log for the portion of the underground formation corresponding to the second cell of the plurality of cells, the second well log including rock properties of the underground formation as measured by the downhole tool in a second offset well.

3. The method of claim 2 wherein assigning further comprises interpolating based on the first measured value, the second measured value, and a distance between the first cell and the second cell.

4. The method of claim 1 wherein the datum of information is a variogram associated with the portion of the underground formation represented by the first cell, and assigning comprises assigning the value of the first rock property to each cell based on the first measured value and the variogram.

5. The method of claim 1 wherein the datum of information is the seismic data derived from the seismic survey, and assigning comprises assigning the value of the first rock property to each cell by co-kriging the corresponding seismic data for that cell and the first measured value of the first rock property.

6. The method of claim 1 wherein the datum of information is derived from a variogram regarding the first rock property.

7. The method of claim 1 wherein creating further comprises:

reading a first value of a second rock property associated with a second well log, the second rock property distinct from the first rock property;

associating the first value of the second rock property with the first cell of the plurality of cells of the geocellular model; and assigning a value of the second rock property to each cell of the plurality of cells based on the first value of the second rock property and the datum of information.

8. The method of claim 1 wherein the first rock property is at least one selected from the group consisting of: gamma reading of the underground formation at a particular depth; porosity of the underground formation at a particular depth; resistivity of the underground formation at a particular depth; spectral information of the underground formation at a particular depth.

9. The method of claim 1:

wherein reading the first measured value further comprises reading without user input;

wherein associating the first measured value of the first rock property further comprises associating without user input; and wherein assigning the value of the first rock property further comprises assigning without user input.

10. A computer system comprising:

a processor;

a memory coupled to the processor;

the memory storing a program that, when executed by the processor, causes the processor to:

create a geocellular model of an underground formation, the geocellular model including a plurality of cells, each cell representing a portion of the underground formation at a location corresponding to that cell's location in the geocellular model;

receive, from a downhole tool communicatively coupled to the processor, measurements of rock properties of the underground formation measured by the downhole tool;

read, from the memory, a first measured value of a first rock property from a first well log including the measured rock properties associated with a portion of the underground formation corresponding to a first cell of the geocellular model;

associate the first measured value of the first rock property with the first cell of the geocellular model;

read, from the memory, a second measured value of the first rock property from a second well log including the measured rock properties for a portion of the underground formation corresponding to a second cell of the geocellular model, the second well log being distinct from the first well log;

associate the second measured value of the first rock property with the second cell of the geocellular model;

assign a value of the first rock property to each cell of the plurality of cells for which no measurement of the first rock property is available, based on an interpolation of the first rock property from the first measured value associated with the first cell, the second measured value associated with the second cell, and a datum of information representing a value of the first rock property for a portion of the underground formation corresponding to a third cell of the plurality of cells, wherein the first and second cells are equidistant from the cell for which no measurement of the first rock property is available;

obtain, by seismic receiving devices coupled to the processor, seismic data derived from a seismic survey of the underground formation;

refine, on a cell-by-cell basis, rock property values assigned to each cell of the geocellular model, based at least partly on the seismic data obtained for the portion of the underground formation corresponding to that cell; and determine a rock type for the portion of the underground formation corresponding to each cell of the refined geocellular model, based on a distribution of rock property values among the plurality of cells.

11. The computer system of claim 10 wherein when the processor assigns the value of the first rock property to each cell, the program causes the processor to interpolate based on the first measured value, the second measured value, and a distance between the first cell and the second cell.

12. The computer system of claim 10:
    wherein the seismic data includes acoustic impedance information derived from the seismic survey; and
    wherein the program causes the processor to update the value of the first rock property assigned to each cell based on the first measured value, the second measured value, and the acoustic impedance information.

13. The computer system of claim 12 wherein the program causes the processor to perform co-kriging based on the first measured value, the second measured value and the acoustic impedance information.

14. The computer system of claim 10 wherein the datum of information is derived from a variogram regarding the first rock property.

15. The computer system of claim 10 wherein the program further causes the processor to:
    read a first value of a second rock property from the second well log, the second rock property distinct from the first rock property;
    associate the first value of the second rock property with the first cell of the plurality of cells of the geocellular model;
    assign a value of the second rock property to each cell of the plurality of cells based on the first value of the second rock property and the datum of information.

16. The computer system of claim 10 wherein the first rock property is at least one selected from the group consisting of: gamma reading of the underground formation at a particular depth; porosity of the underground formation at a particular depth; resistivity of the underground formation at a particular depth; or spectral information of the underground formation at a particular depth.

17. A non-transitory computer-readable medium storing a program that, when executed by a processor, causes the processor to:
    create a geocellular model of an underground formation, the geocellular model including a plurality of cells, each cell representing a portion of the underground formation at a location corresponding to that cell's location in the geocellular model;
    receive, from a downhole tool communicatively coupled to the processor, rock properties of the underground formation measured by the downhole tool;
    read a first measured value of a first rock property from a first well log including the measured rock properties associated with a portion of the underground formation corresponding to a first cell of the geocellular model;
    associate the first measured value of the first rock property with the first cell of the geocellular model of an underground formation;
    read a second measured value of the first rock property from a second well log including the measured rock properties for a portion of the underground formation corresponding to a second cell of the geocellular model, the second well log being distinct from the first well log;
    associate the second measured value of the first rock property with the second cell of the geocellular model;
    assign a value of the first rock property to each cell of the plurality of cells for which no measurement of the first rock property is available, based on an interpolation of the first rock property from the first measured value associated with the first cell, the second measured value associated with the second cell, and a datum of information representing a value of the first rock property for a portion of the underground formation corresponding to a third cell of the plurality of cells, wherein the first and second cells are equidistant from the cell for which no measurement of the first rock property is available;
    obtain, from seismic receiving devices coupled to the processor, seismic data derived from a seismic survey of the underground formation;
    refine, on a cell-by-cell basis, rock property values assigned to each cell of the geocellular model, based at least partly on the seismic data obtained for the portion of the underground formation corresponding to that cell; and
    determine a rock type for the portion of the underground formation corresponding to each cell of the refined geocellular model, based on a distribution of rock property values among the plurality of cells.

18. The computer-readable medium of claim 17 wherein when the processor assigns the value of the first rock property to each cell, the program causes the processor to interpolate based on the first measured value, the second measured value, and a distance between the first cell and the second cell.

19. The computer-readable medium of claim 17:
    wherein the seismic data includes acoustic impedance information derived from the seismic survey; and
    wherein the program causes the processor to update the value of the first rock property assigned to each cell based on the first measured value, the second measured value, and the acoustic impedance information.

20. The computer-readable medium of claim 19 wherein the program causes the processor to perform co-kriging based on the first measured value, the second measured value and the acoustic impedance information.

21. The computer-readable medium of claim 17 wherein the datum of information is derived from a variogram regarding the first rock property.

22. The computer-readable medium of claim 17 wherein the program further causes the processor to:
    read a first value of a second rock property from the second well log, the second rock property being distinct from the first rock property;
    associate the first value of the second rock property with the first cell of the plurality of cells of the geocellular model;
    assign a value of the second rock property to each cell of the plurality of cells based on the first value of the second rock property and the datum of information.

23. The computer-readable medium of claim 17 wherein the first rock property is at least one selected from the group consisting of: gamma reading of the underground formation at a particular depth; porosity of the underground formation at a particular depth; resistivity of the underground formation at a particular depth; or spectral information of the underground formation at a particular depth.

* * * * *